United States Patent

Szabo et al.

[11] Patent Number: 5,542,716
[45] Date of Patent: Aug. 6, 1996

[54] QUICK CONNECTOR WITH SNAP-ON RETAINER

[75] Inventors: George Szabo, Ortonville; Andrew G. McGuire, St. Clair, both of Mich.

[73] Assignee: ITT Corporation, New York, N.Y.

[21] Appl. No.: 334,754

[22] Filed: Nov. 4, 1994

[51] Int. Cl.⁶ .................................................. F16L 37/14
[52] U.S. Cl. ............................................ 285/305; 285/319
[58] Field of Search ................................ 285/305, 24, 27, 285/319, 921

[56] References Cited

U.S. PATENT DOCUMENTS

| | | |
|---|---|---|
| 3,245,702 | 4/1966 | Smith . |
| 3,560,027 | 2/1971 | Graham .......................... 285/305 X |
| 3,794,057 | 2/1974 | Badger . |
| 4,423,892 | 1/1984 | Bartholomew . |
| 4,431,218 | 2/1984 | Paul et al. ........................ 285/305 |
| 4,433,861 | 2/1984 | Kreczik . |
| 4,524,995 | 6/1985 | Bartholomew . |
| 4,526,411 | 7/1985 | Bartholomew . |
| 4,591,192 | 5/1986 | Van Exel et al. . |
| 4,869,534 | 9/1989 | Ketcham et al. . |
| 4,874,174 | 10/1989 | Kojima et al. . |
| 4,925,217 | 5/1990 | Ketcham . |
| 4,936,544 | 6/1990 | Bartholomew . |
| 4,946,205 | 8/1990 | Washizu . |
| 4,948,175 | 8/1990 | Bartholomew . |
| 5,102,313 | 4/1992 | Szabo ............................. 417/572 |
| 5,152,555 | 10/1992 | Szabs . |
| 5,178,424 | 1/1993 | Klinger . |
| 5,226,679 | 7/1993 | Klinger . |
| 5,275,443 | 1/1994 | Klinger . |
| 5,297,818 | 3/1994 | Klinger . |
| 5,348,353 | 9/1994 | Deweerdt ...................... 285/305 |
| 5,405,175 | 4/1995 | Bonnah et al. ................. 285/305 |

*Primary Examiner*—Dave W. Arola
*Attorney, Agent, or Firm*—Robert P. Seitter; J. Gordon Lewis

[57] ABSTRACT

A retainer for releasably locking the male and female component of a quick connector together. The retainer is releasably insertable into a transverse bore formed in the female component and includes a recess engageable with a radial flange on the male component only when the male component is fully coupled in an axial bore in the female component. The engagement of the recess and the radial flange on the male component permits full insertion of the retainer into the transverse bore in the female component around the male component to lock the male component and female component together. The female component has opposed interior surfaces spaced sufficiently apart to permit the deflectable legs formed on the retainer to flex apart while being slidingly urged over the male component to snap over the male component. The opposed surfaces block full insertion of the retainer into the female component when the male component is not fully seated in the female component. Lock projections are formed on the retainer to releasably lock the retainer in a partially inserted, shipping position in the transverse bore in the female component.

8 Claims, 4 Drawing Sheets

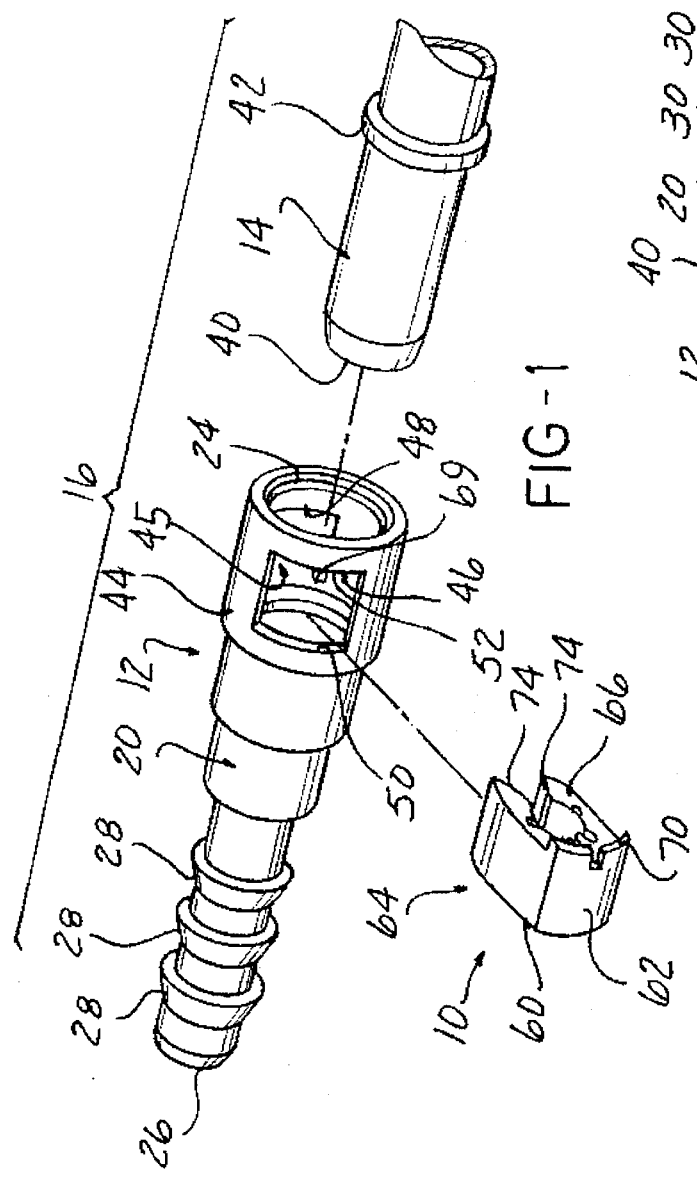
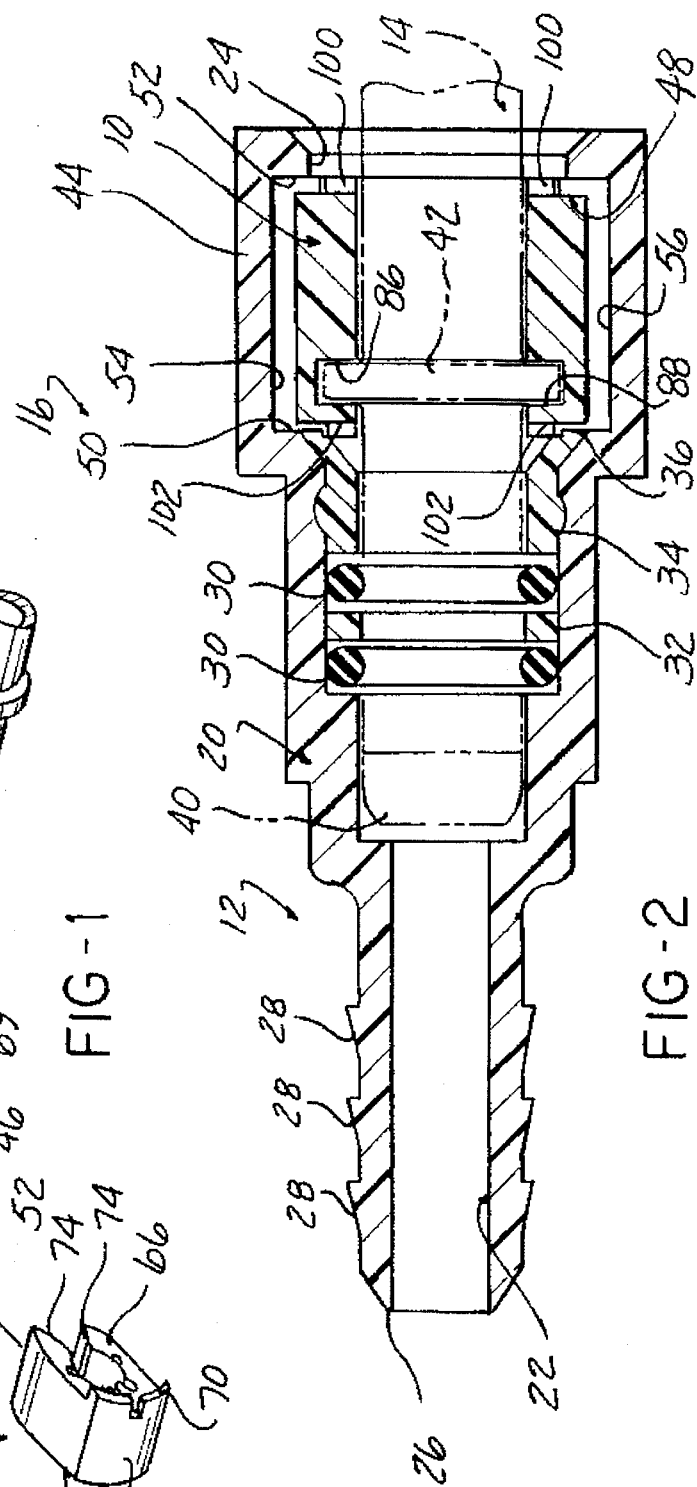
FIG-1
FIG-2

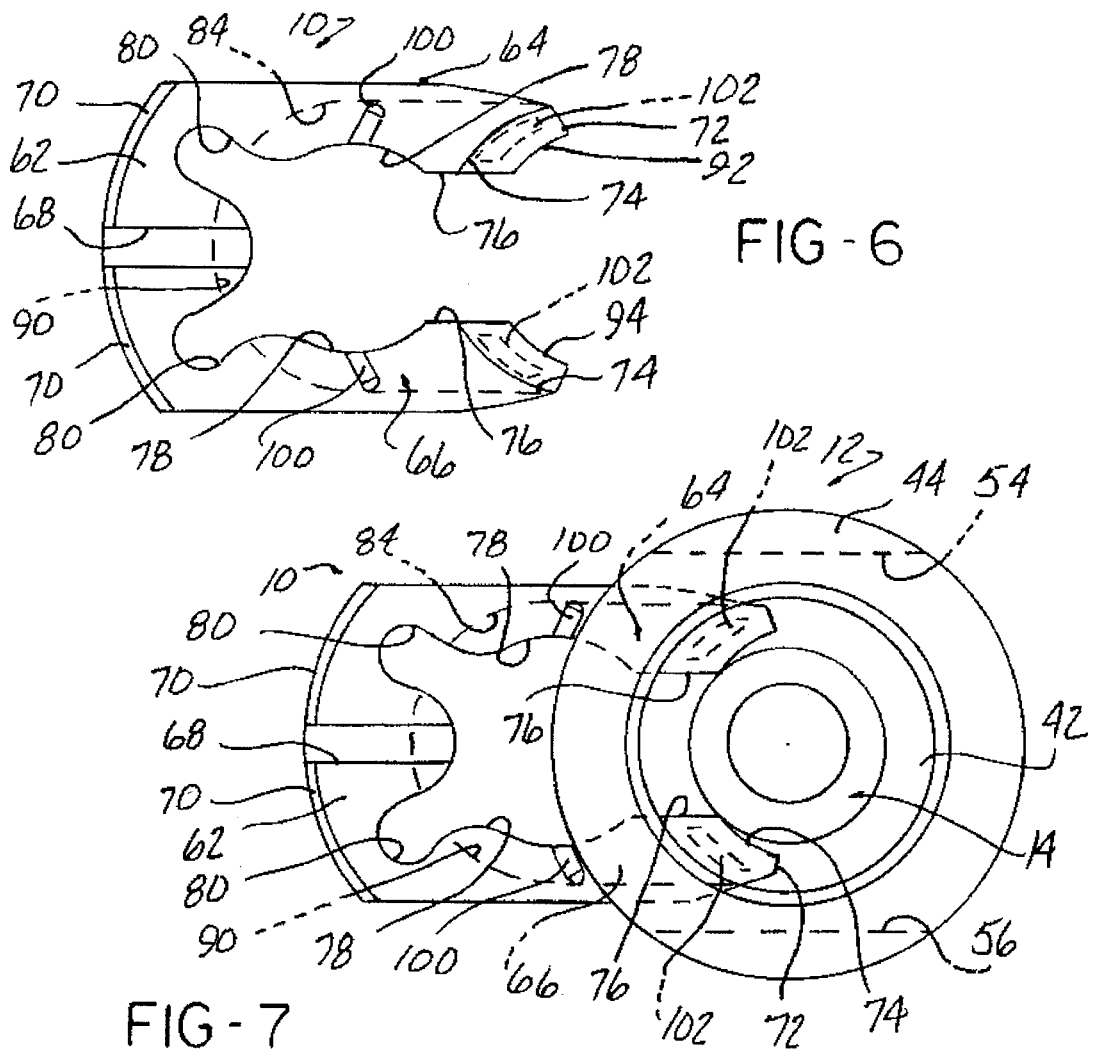
FIG-6
FIG-7
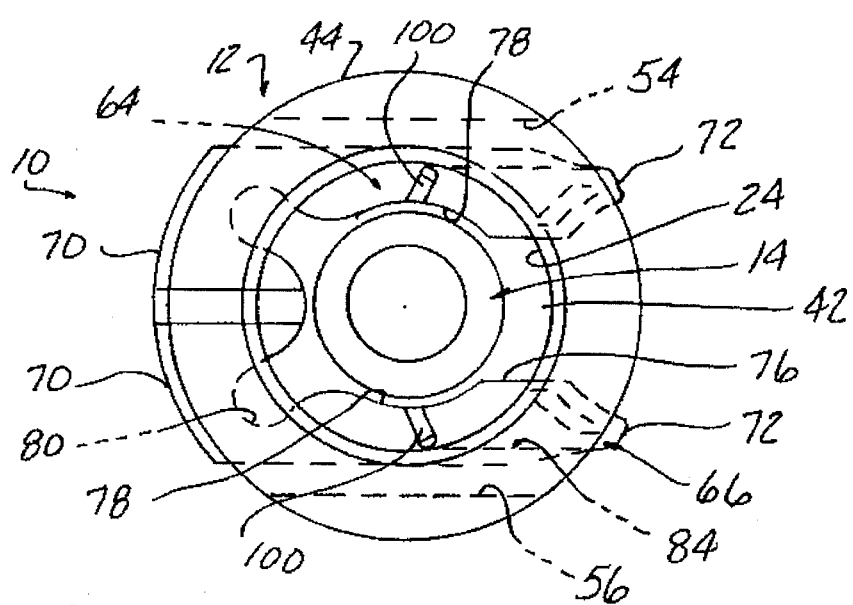
FIG-9

QUICK CONNECTOR WITH SNAP-ON RETAINER

BACKGROUND OF THE INVENTION

1. Field of the Invention

The present invention relates, in general, to quick connectors and, more specifically, to quick connectors including an internal retainer and means providing an indication of complete coupling between the male and female elements of the quick connector.

2. Description of the Art

Snap-fit or quick connectors are employed in a wide range of applications, particularly, for joining fluid carrying conduits in automotive and industrial application. In a typical quick connector, a retainer is fixedly mounted within a bore in a housing of a female connector component or element. The retainer has a plurality of radially extending legs which extend inwardly toward the axial center line of the bore in the housing. A tube or fitting to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs.

While such a retainer is usually effective in releasably coupling the male and female elements of a quick connector, it is possible that the male fitting may be partially, but not fully seated or coupled to the internal seal elements in the bore of the female component and not fully locked in position by the retainer legs. In this partially engaged position, the male fitting may work itself free of the housing thereby leading to leaks in the fluid delivery system.

As it is desirable to ensure that the male and female elements are fully coupled to prevent leaks, various indicators have been provided to indicate a full coupling or seating of the male fitting in the female element. In one type of indicator shown in U.S. Pat. No. 4,925,217, a deformable member is assembled within the fitting which includes elongated members extending out of the housing between the male and female elements prior to coupling and which are retracted, and no longer visible, once the coupling has been fully accomplished. The annular member in this device remains in assembly with the quick connector and contributes to component count, tolerance stack-up and possible misassembly. Furthermore, the elongated members which are visible during non-coupling of the connector are, by design, not visible after coupling is fully effected. In many applications, such as an extremely crowded engine compartment of a motor vehicle, the installed coupling may be difficult to see and inspect closely. Thus, the inability to see the elongated members from a distance or from an awkward position will not result in a high degree of confidence that the coupling has in fact fully taken place.

Other types of visual indicators, as shown in U.S. Pat. No. 4,946,205, are removable after full coupling of the male and female quick connector elements. However, the indicator disclosed in this patent is complex and adds considerable axial length to the quick connector.

To overcome these problems and to provide an advancement in the quick connector art, the quick connect insertion indicator clip disclosed in U.S. Pat. No. 5,152,555, assigned to the assignee of the present invention, was devised. This indicator clip includes a flag portion positioned externally of the quick connector and has members extending from the flag portion to embrace the female element of the quick connector. Engagement tabs extending from the members through registering apertures in the female element will contact an abutment surface formed on the male element upon full coupling of the male and female components to enable removal of the indicator device as verification of complete or full coupling. When coupling is incomplete or not fully effected, the indicator device cannot be removed from the female component.

While the insertion indicator clip disclosed in U.S. Pat. No. 5,152,555 provides an easily visible indication of complete coupling of quick connector components, the quick connector still requires a separate retainer to lockingly couple the male and female components together.

Thus, it would be desirable to provide a retainer for a quick connector which performs the dual functions of lockingly engaging the female and male components as well as providing a visual indication of complete or incomplete coupling between the male and female components. It would also be desirable to provide a retainer for a quick connector which has a simple construction for a low manufacturing cost and ease of use. It would also be desirable to provide a retainer for a quick connector which provides a visual indication of coupling and which does not require extensive modification to existing quick connector designs. Finally, it would be desirable to provide a retainer for a quick connector which can be installed in a temporary engaged position on the female component of the quick connector for shipment and subsequent use.

SUMMARY OF THE INVENTION

The present invention is a quick connector with a snap-on retainer which provides releasably locking engagement of male and female components of the quick connector and a visual indication of complete or incomplete coupling between the male and female components.

The quick connector includes mating male and female components or elements. The female component includes a housing having an axially extending bore terminating at an open end of the housing for receiving the male element therein. A transverse extending bore is formed in the housing in communication with the axially extending bore. The male component has a radially enlarged portion spaced from one end. A retainer means is slidable through the transverse bore in the housing only when the male component is fully coupled to the female component for releasably locking the male and female components together.

In a preferred embodiment, the retainer means preferably comprises a body having an end wall and first and second spaced legs extending from the end wall and terminating in outer ends. The first and second legs define an aperture therebetween extending from an open end between the outer ends of the first and second legs and a closed end at the end wall of the body.

A radial flange receiving means is formed in the first and second legs for receiving the radial flange on the male component only when the male component is fully seated in the female component and for permitting sliding movement of the first and second legs of the retainer means over the male component as the body is urged through the transverse bore in the housing.

The nominal width of the opening between the first and second legs is less than the outer diameter of the male component adjacent to the radial flange on the male component. In a preferred embodiment, the radial flange receiving means includes first and second slots formed respectively in the first and second legs of the body. The first and second slots are co-planarly arranged on opposite sides of the aperture between the first and second legs. The width of the transverse bore in the housing, the width of the body of the retainer means and the dimensional spacing between the first and second slots in the first and second legs of the body and one side wall of the body surrounding the transverse bore is such that the first and second slots are alignable with and slidingly engage the radial flange on the male component when the body is slidingly urged into the transverse bore in the housing. This dimensional relationship prohibits the inward sliding movement of the body of the retainer means into the transverse bore of the housing over and around the male component if the male component is not fully seated in the female component since the slots in the first and second legs of the body are misaligned with the radial flange in the male components.

The outer ends of the first and second legs of the body have a cam surface means formed thereon for urging the first and second legs oppositely outward from each other as the body is urged over the male component.

The housing of the female component preferably includes opposed surfaces at the intersection of the axially extending bore and the transverse bore. The opposed surfaces block the outward movement of the first and second legs of the body when the body is urged into the transverse bore and the male component is not fully coupled to the female component to prevent full insertion of the body into the housing thus provides an indication to the user that the male component is not fully seated in or coupled to the female component.

Means are also formed on the body for releasably locking the body in a partially inserted position in the transverse bore in the housing. In this position, the ends of the first and second legs are clear of the axially extending bore in the housing to enable insertion of the male component into the axially extending bore in the housing. Preferably, the releasable locking means comprises at least one pair of projections formed on at least one of the first and second legs. The projections are spaced apart to respectively engage an outer surface of the housing and an inner portion of the housing. Preferably, a pair of spaced projections are formed on each of the first and second legs of the body.

Means are also formed on the end wall of the body for limiting the insertion distance of the body into the transverse bore in the housing. The distance limiting means preferably comprises a lip formed on and extending outward from the end wall of the body. The lip engages the housing when the body is urged into the transverse bore in the housing.

The snap-on retainer of the present invention provides unique advantages when used with a conventional quick connector. One, the retainer serves the dual functions of lockingly engaging the male and female components of the quick connector and, at the same time, providing a visual indication of full coupling of the male and female components. The retainer is of simple construction for a low manufacturing cost and ease of use. Further, the unique retainer of the present invention does not require extensive modification to existing quick connector designs. The present snap-on retainer also reduces or minimizes the axial movement of the male component when engaged with the female component. Finally, the retainer of the present invention may be mounted in a partially inserted position on the female component of the quick connector for shipment and for ease of use after the male component has been inserted into the female component of the quick connector.

BRIEF DESCRIPTION OF THE DRAWINGS

The various features, advantages and other uses of the present invention will become more apparent by referring to the following detailed description and drawings in which:

FIG. 1 is an exploded, perspective view of a quick connector with a snap-on retainer constructed in accordance with the teachings of the present invention;

FIG. 2 is a longitudinal cross-sectional view showing the assembled position of the female and male components of the quick connector and the snap-on retainer depicted in FIG. 1;

FIG. 6 is a plan view of the retainer shown in FIG. 3;

FIG. 7 is a right end view of FIG. 2 showing the shipping position of the retainer in the female component of the quick connector;

FIG. 9 is a right end view of FIG. 2 showing the assembled male and female components of the quick connector and the retainer.

DESCRIPTION OF THE PREFERRED EMBODIMENT

Figure 3:
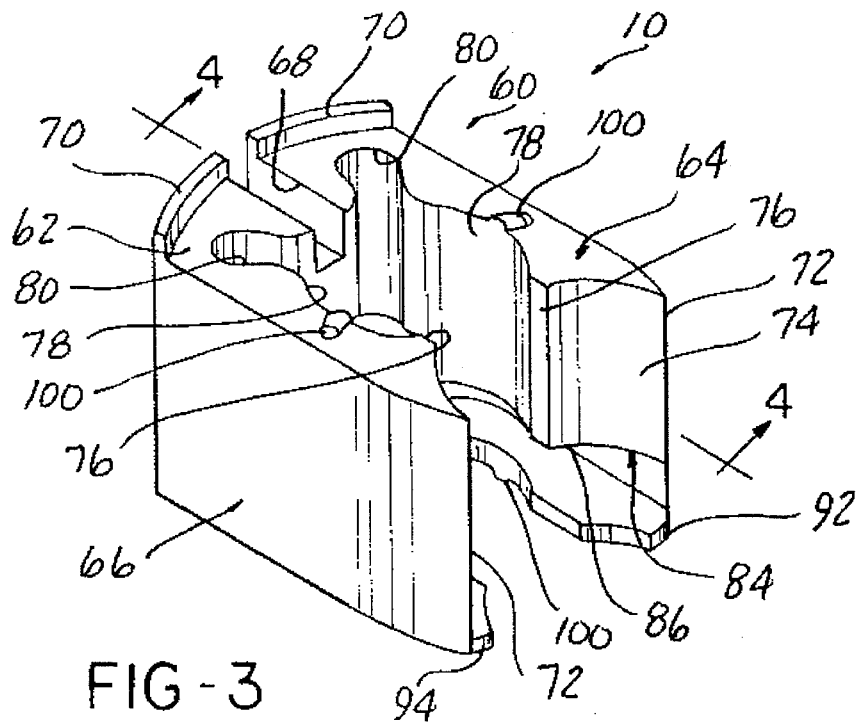
FIG. 3 is a an enlarged, perspective view of the snap-on retainer of the present invention.
Figure 4:
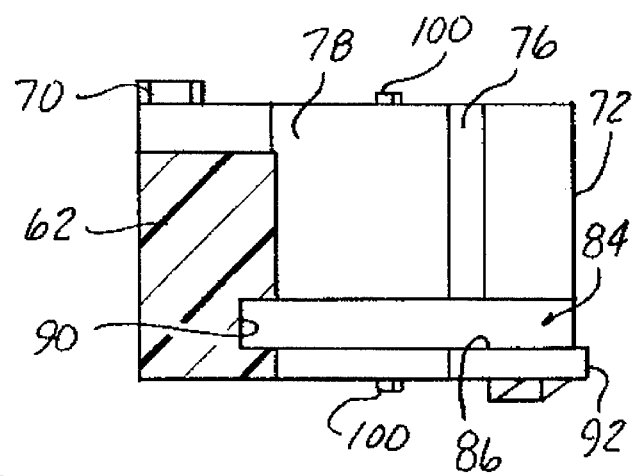
FIG. 4 is a cross-sectional view generally taken along line 4—4 in FIG. 3.

Referring now to the drawing, and to FIGS. 1 and 2 in particular, there is depicted a snap-on retainer 10 which lockingly engages the female and male components 12 and 14, respectively, of a quick connector 16 together.

The following description of the female connector component or element 12 is by way of example only as the female connector component 12 may have any suitable shape typically found in quick connectors.

The female connector component 12 includes a housing 20 having an elongated, axially extending, stepped axial bore 22 extending therethrough from a large diameter first end 24 to a smaller diameter second end 26. A plurality of raised, annular ridges or flanges 28 are formed on one end of the housing 20 adjacent the second end 26 of the axial bore 22 for securely engaging a flexible conduit or hose, not shown.

As is typical in quick connectors, one or two O-rings 30, and an interposed spacer 32 and top hat 34 are mounted within an intermediate portion of the stepped bore 22 for sealingly engaging one end of the male component or fitting 14 as shown in FIG. 2.

As shown in FIGS. 1 and 2, and as is typical, the male component or fitting 14 is in the form of a tubular member having a first end 40 and an annular, radially extending flange or upset 42 formed on and spaced from the end 40. In a fully engaged or coupled position shown in FIG. 2, the end 40 of the fitting 14 extends through and beyond the O-rings 30, the spacer 32 and the top hat 34, with the O-rings 30, the spacer 32 and the top hat 34 forming a seal about the fitting 14. In this fully coupled position, the radial flange 42 on the male component or fitting 14 is positioned within an enlarged diameter end portion 44 in the housing 20 of the female component 12.

A transverse bore 45 is formed in the enlarged end portion 44 of the housing 20 in communication with the axial bore 22 extending through the housing 20. The transverse bore 45 formed in the housing 20 preferably by two opposed, identically shaped apertures 46 and 48 formed on opposite sides of the enlarged end portion 44 of the housing 20. Each aperture 46 and 48 forms a pair of opposed arcuate shaped sidewalls 50 and 52 on opposed surfaces of the enlarged end portion 44 of the housing 20. The sidewalls 50 and 52 are spaced apart a predetermined distance which is slightly greater than the width of the retainer 10, as described hereafter, to enable sliding insertion of the retainer 10 into the transverse bore formed in the enlarged end portion 44 of the housing 20. The intersection of the transverse bore 45 and the axial bore 22 in the housing 20 forms a pair of opposed surfaces 54 and 56 in the enlarged end portion 44 of the housing 20. The surfaces 54 and 56 have a generally planar configuration as shown in FIGS. 7–10.

The retainer 10 is shown in greater detail in FIGS. 3, 4, 5 and 6. Preferably, the retainer 10 is in the form of a unitary, one piece body 60 which includes an end wall 62 and first and second legs 64 and 66 spaced apart and extending generally in parallel from the end wall 62. The body 60 is formed of a suitable material such as a heat stabilized, glass filled Nylon 12-23x, by example only.

The end wall 62 has a generally arcuate exterior shape, by way of example only. A recess 68 is formed in one side of the end wall 62. The recess 68 engages a nub or projection 69 formed on the sidewall 52 of the end portion 44 of the housing 20 to properly orient the retainer 10 in the end portion 44. Further, a raised lip 70 formed of two discontinuous portions disposed on both or one side of the recess 68 is also formed in and extends outward from one side of the end wall 62. The purpose of the lip 70 will be described in greater detail hereafter in conjunction with the description of FIG. 9.

As each of the first and second legs 64 and 66, respectively, are substantially identically constructed, the following description of the first leg 64 will be understood to apply equally to the second leg 66. The first leg 64 extends from the end wall 62 and terminates in an outer end 72. A cam surface means preferably in the form of an arcuate shaped surface 74 extends from the outer end 72 of the first leg 64 inward toward the opposed second leg 66 and terminates in a flat 76. The flat 76 has an angular orientation with respect to the outer surface of the leg 64 and diverges from the opposed flat 76 on the leg 66 to further provide camming of the legs 64 and 66 outward when the retainer 10 is urged over the male component or fitting 14. The inner surface of the first leg 64 opposing the second leg 66 extends from the flat 76 toward the end wall 62 in the form of a generally circular or arcuate surface 78 which is sized to securely engage the peripheral surface of the male component or fitting 14 when the retainer 10 is inserted into the enlarged end portion 44 of the female component 12, as described hereafter and shown in FIG. 9.

As shown more clearly in FIG. 7, the distance or spacing between the cam surfaces 74 and the flats 76 of the legs 64 and 66 of the body of the retainer 60 is less than the nominal O.D. of the fitting 14 on adjacent sides of the radial flange 42.

Each leg 64 and 66 is further formed with a cutout or notch 80 at the juncture of each leg 64 and 66 and the end wall 62. The cutout or notch 80 permits easy flexure or deflection of the legs 64 and 66 from the normal position shown in FIGS. 3, 6 and 7 to an outwardly deflected position as the retainer 10 is urged into the female component 12 and over the fitting 14.

As shown in FIGS. 3–10, the retainer 10 is uniquely formed with radial flange receiving means denoted generally by reference number 84 which is formed in the body 60 for receiving the radial flange 42 on the fitting 14 only when the fitting 14 is fully seated or coupled in the bore 22 in the female component 12 to permit the sliding movement of the first and second legs 64 and 66 over the male element 14 as the retainer 10 is urged through the bore 46 in the housing 20 of the female component 12. The radial flange receiving means 84 is preferably in the form of a continuous U-shaped slot including first and second spaced, co-planar, slot portions 86 and 88, respectively, disposed adjacent to the first and second legs 64 and 66 and interconnected by an arcuate shaped end slot portion 90 formed in the end wall 62 of the body 60 of the retainer 10.

Figure 5:
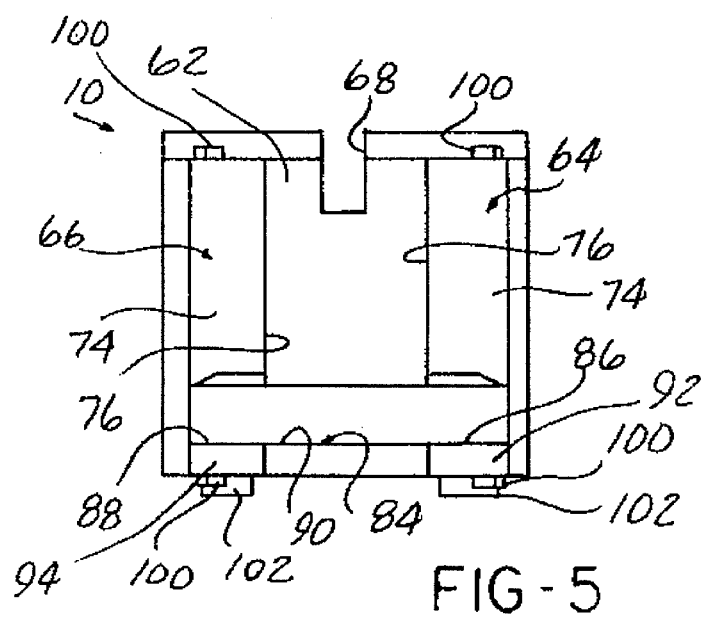
FIG. 5 is a righthand end view of the retainer shown in FIG. 3.

The slot portions 86 and 88 are formed between the cam-like surfaces 74 and the flat 76 on each of the first and second legs 64 and 66 and an outer side edge wall 92 and 94 on each of the first and second legs 64 and 66, respectively, as shown in FIGS. 3 and 5.

The slot portions 86 and 88 and the interconnecting end slot portion 90 form a continuous internal slot or recess in the retainer 10 which is sized to slidably move over the radial flange 42 on the male fitting 14. Thus, the width of the slot portions 86, 88 and 90 is only slightly larger than the width or thickness of the radial flange 42 on the fitting 14.

A pair of projections are formed on at least one and preferably on both of the legs 64 and 66 of the body 60 of the retainer 10 for releasably mounting the retainer 10 in a temporary shipping position, shown in FIG. 7, on the female component 12. Preferably, the pairs of projections on the legs 64 and 66 include a first projection 100 formed on the outer side edges of each leg 64 and 66. The projections 100 angle outwardly from the side edge of the legs 64 and 66 and terminate in an outwardly extending tip or head.

A second set of projections, each projection denoted by reference number 102 as shown in FIGS. 4–8, is also provided on the outer side edge walls 92 and 94 of the body 60.

The pairs of projections 100 and 102 enable the retainer 10 to be temporarily and releasably attached to the female component 12, as shown in FIG. 7, in a temporary position for shipping and pre-use. In this position, the projections 100 engage the outer surface of the enlarged end portion 44 of the housing of the female component 12, while the pair of projections 102 engage an inner portion of the housing 44, such as an edge of the top hat 34 mounted in the stepped portion of the bore 22 of the female component 12, as shown in FIG. 2. This releasably retains the retainer 10 in a partially inserted position into the transverse bore in the female component 12 with the ends 72 of the legs 64 and 66 of the retainer 10 partially extending into the axially extending bore in the enlarged end portion 44 of the female component 12, but providing sufficient clearance to enable insertion of the male fitting 14 into the female component 12. The resilient nature of the material forming the retainer 10 and the small projection height of the projections 100 and 102 enable the retainer 10 to be forcibly urged from the temporary position shown in FIG. 7 to the fully inserted position shown in FIG. 9 during which movement the projections 100 and 102 snap over the mating surfaces in the female component 12, as described in greater detail hereafter.

In use, the retainer 10 can be partially inserted and releasably locked in place in the female component 12, as shown in FIG. 7 and described above. Next, the fitting 14 is engaged with the female component 12 by inserting the end 40 of the male fitting 14 through the first end 24 in the female component 12 and into the stepped portion of the bore 22 in the female component 12 as shown in FIG. 2. When the male component or fitting 14 is fully seated or coupled to the female component 12 in the fully inserted position shown in FIG. 2, the radial flange 42 on the male fitting 14 will be disposed in the position shown in FIG. 2 within the intersecting axial and transverse bores in the enlarged end portion 44 of the female component 12. Only when the fitting 14 is fully coupled or seated in the female component 12, will the radial flange 42 on the fitting 14 be aligned with the radial flange receiving means or slots 86 and 88 in the retainer 10.

Figure 8:
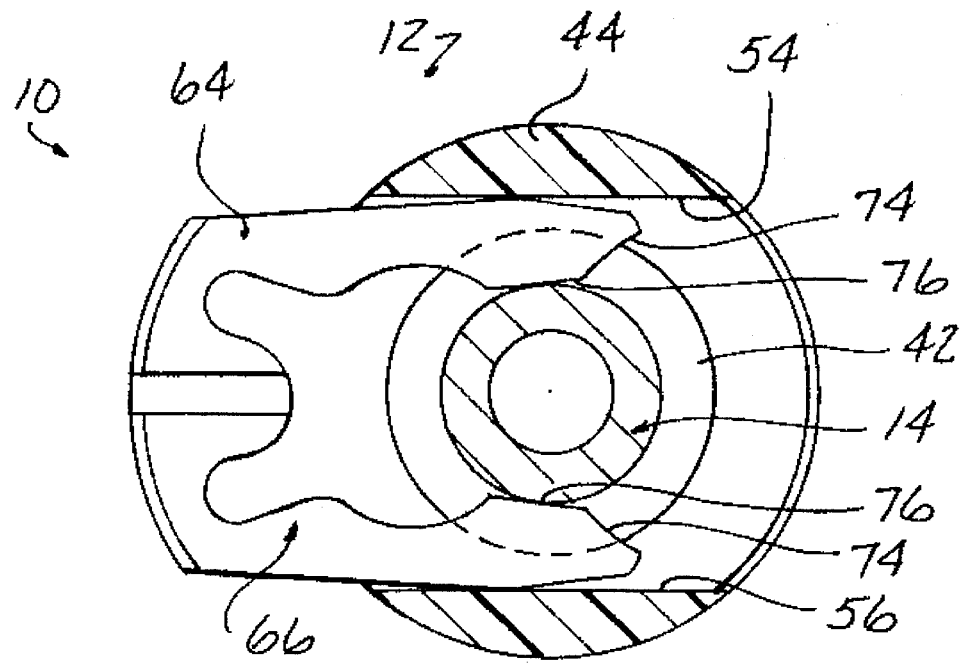
FIG. 8 is a cross-sectioned, right end view showing an intermediate insertion position of the retainer into the female component.

The alignment of the radial flange 42 and the radial flange receiving means or slots 86 and 88 enables the retainer 10 to be forcibly slid inward into the enlarged end portion 44 of the female component 12 with the slots 86 and 88 sliding over the radial flange 42 on the fitting 14. During such inward movement of the retainer 10, when the fitting 14 is fully seated in the female component 12, the arcuate, cam surfaces 74 on the legs 64 and 66 will slidably engage the exterior surface of the male fitting 14 and deflect oppositely outward from the opposite leg 64 or 66, as shown in FIG. 8, a sufficient amount to enable the legs 64 and 66 to pass over the O.D. of the male fitting 14 and snap back into the normal, substantially parallel position in which the arcuate surface 78 in each of the legs 64 and 66 is disposed in close proximity to or registry with the exterior surface of the male fitting 14. This snap action may produce a "click" sound to indicate full engagement of the retainer 10 about the fitting 14. Further, the lip 70 on the retainer 10 will engage the exterior surface of the housing of the female component 12 to limit the amount of insertion distance of the retainer 10 into the female component 12, as shown in FIG. 9.

Figure 10:
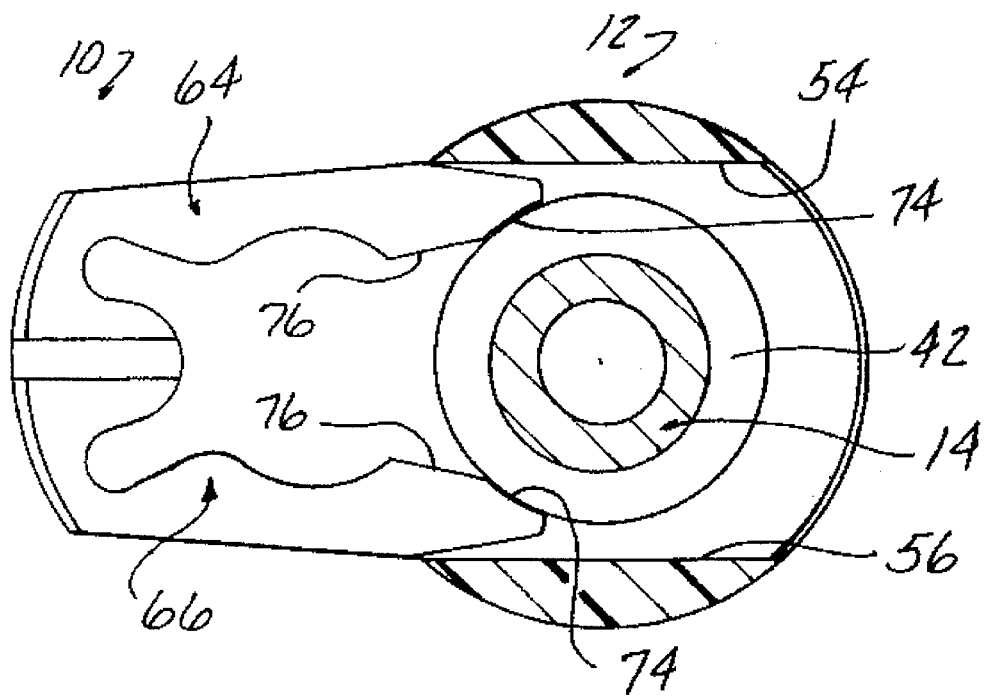
FIG. 10 is a cross-sectioned, right end view showing the blocked position of the retainer when the male component is not fully seated in the female component of the quick connector.

In the event that the fitting 14 is not fully seated or coupled in the bore 22 of the female component 12, the radial flange 42 on the male fitting 14 will be disposed rearward of the fully coupled position shown in FIG. 2. Due to the dimensional relationship between the width of the retainer 10 and the width of the opening between the sidewalls 50 and 52 about the apertures 46 and 48 in the enlarged end portion 44 of the female component 12, when the retainer 10 is forcibly urged into the enlarged end portion 44, the slots 86 and 88 will be misaligned with radial flange 42 on the male fitting 14. This misalignment will cause the cam surface 74 on the legs 64 and 66 to engage the radial flange 42 and deflect the legs 64 and 66 apart a greater distance than when the radial flange 42 is aligned with the slots 86 and 88. This greater outward movement or deflection of legs 64 and 66 will cause the legs 64 and 66 to engage the opposed surfaces 54 and 56 in the enlarged end portion 44 of the female component 12, as shown in FIG. 10 thereby blocking further insertion of the retainer 10 into the female component 12. This provides an easily visible indication that the fitting 14 is not fully seated or coupled in the female component 12. Adjustments can be made to the position of the fitting 14 relative to the female component 12 to fully seat or couple the fitting 14 and female component 12 together and to bring the radial flange 42 on the fitting 14 into alignment with the slots 86 and 88 in the retainer 10.

When it is desired to decouple the female component 12 and the fitting 14, the retainer 10 is forcibly pulled outward from the female component 12 either completely from the female component 12 or back to the temporary shipping position shown in FIG. 7. This releases the retainer 10 from the radial flange 42 on the male fitting 14 permitting disengagement of the fitting 14 from the female component 12.

In summary, there has been disclosed a unique retainer for a quick connector which provides minimal axial movement of the male component when engaged in the female component, releasable locking of the male and female components of the quick connector together as well as a visual indication of complete or incomplete coupling of the male and female components. The retainer has a simplified construction for a low manufacturing cost and ease of use. Further, the retainer provides both retaining and visible coupling indication features in a single element thereby reducing component count and the need for any special modification to conventional quick connector designs.

What is claimed is:

1. A quick connector comprising:

mating male and female components;

the female component including a housing having an axially extending bore terminating at an open end of the housing for receiving the male component therein;

a transverse extending bore formed in the housing in communication with the axially extending bore;

the male component having a radially enlarged flange spaced from one end;

retainer means, slidable through the transverse bore in the housing only when the male component is fully coupled to the female component, for releasably locking the male and female components together;

the retainer means including:

a body having an end wall and first and second spaced legs extending from the end wall and terminating in outer ends;

the first and second legs defining an aperture therebetween extending from an open end at the outer ends of the first and second legs and an end at the end wall; and radial flange receiving means, formed on the body, for receiving the radial flange on the male component only when the male component is fully coupled in the female component and for permitting sliding movement of the first and second legs over the male component as the body is urged through the transverse bore in the female component; and means for releasably locking the body in a partially inserted position in the transverse bore in the housing with the outer ends of the first and second legs clear of the axially extending bore in the housing to enable insertion of the male component into the female component.

2. The quick connector of claim 1 wherein the releasably locking means comprises:

a pair of projections formed on at least one of the first and second legs, the pair of projections being spaced apart to engage an outer surface of the housing of the female component and an inner portion of the female component.

3. The quick connector of claim 2 further comprising:

one pair of spaced projections formed on each of the first and second legs.

4. The quick connector of claim 2 wherein:

one projection of the pair of projections extends outward from one side of the at least one of the first and second legs; and the other projection of the pair of projections extends outward from another side of the at least one of the first and second legs.

5. A quick connector comprising:

mating male and female components;

the female component including a housing having an axially extending bore terminating at an open end of the housing for receiving the male component therein;

a transverse extending bore formed in the housing in communication with the axially extending bore;

the male component having a racially enlarged flange spaced from one end;

retainer means, slidable through the transverse bore in the housing only when the male component is fully coupled to the female component, for releasably locking the male and female components together;

the retainer means including:

a body having an end wall and first and second spaced legs extending from the end wall and terminating in outer ends;

the first and second legs defining an aperture therebetween extending from an open end at the outer ends of the first and second legs and an end at the end wall;

radial flance receiving means, formed on the body, for receiving the radial flange on the male component only when the male component is fully coupled in the female component and for permitting sliding movement of the first and second legs over the male component as the body is urged through the transverse bore in the female component; and recess means, formed on the body at a juncture of the end wall and each of the first and second legs, for assisting in deflection of the first and second legs.

6. A quick connector comprising:

mating male and female components;

the female component including a housing having an axially extending bore terminating at an open end of the housing for receiving the male component therein;

a transverse extending bore formed in the housing in communication with the axially extending bore;

the male component having a radially enlarged flange spaced from one end;

retainer means, slidable through the transverse bore in the housing only when the male component is fully coupled to the female component, for releasably locking the male and female components together;

the retainer means including:

a body having an end wall and first and second spaced legs extending from the end wall and terminating in outer ends;

the first and second legs defining an aperture therebetween extending from an open end at the outer ends of the first and second legs and an end at the end wall;

radial flange receiving means, formed on the body, for receiving the radial flange on the male component only when the male component is fully coupled in the female component and for permitting sliding movement of the first and second legs over the male component as the body is urged through the transverse bore in the female component; and means, formed in the end wall of the body, for limiting the distance of insertion of the body into the transverse bore in the housing.

7. The quick connector of claim 6 wherein the distance limiting means comprises:

a lip formed on and extending outward from the end wall of the body, the lip engaging the housing of the female component when the body is urged into the transverse bore in the female component.

8. A quick connector wherein:

mating male and female components;

the female component including a housing having an axially extending bore terminating at an open end of the housing for receiving the male component therein;

a transverse extending bore formed in the housing in communication with the axially extending bore;

the male component having a radially enlarged flange spaced from one end;

retainer means, slidable through the transverse bore in the housing only when the male component is fully coupled to the female component, for releasably locking the male and female components together;

the retainer means including:

a body having an end wall and first and second spaced legs extending from the end wall and terminating in outer ends;

the first and second legs defining an aperture therebetween extending from an open end at the outer ends of the first and second leg and an end at the end wall;

radial flange receiving means, formed on the body, for receiving the radial flange on the male component only when the male component is fully coupled in the female component and for permitting sliding movement of the first and second legs over the male component as the body is urged through the transverse bore in the female component;

the transverse bore in the housing formed by two oppositely disposed apertures in the housing, each aperture bounded by a pair of opposed sidewalls;

a spacing between the pair of opposed sidewalls of each aperture and a width of the body of the retainer disposed in a dimensional relationship to permit sliding movement of the retainer through the apertures in the housing; and the radial flange receiving means formed in the body of the retainer spaced from one sidewall of the retainer by a distance substantially equal to the distance between the radial flange on the male element and one of the sidewalls bounding the apertures in the housing when the male component is fully coupled in the female component.

\* \* \* \* \*